(12) United States Patent
Carpenter, III et al.

(10) Patent No.: US 12,416,271 B2
(45) Date of Patent: Sep. 16, 2025

(54) INTERNAL COMBUSTION ENGINE AS A CHEMICAL REACTOR TO PRODUCE SYNTHESIS GAS FROM HYDROCARBON FEEDS

(71) Applicant: Research Triangle Institute, Research Triangle Park, NC (US)

(72) Inventors: John Reeves Carpenter, III, Research Triangle Park, NC (US); David Douglas Barbee, Research Triangle Park, NC (US); Apoorv Agarwal, Research Triangle Park, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 217 days.

(21) Appl. No.: 18/138,198

(22) Filed: Apr. 24, 2023

(65) Prior Publication Data

US 2023/0332553 A1    Oct. 19, 2023

Related U.S. Application Data

(62) Division of application No. 16/652,307, filed as application No. PCT/US2018/052367 on Sep. 24, 2018, now Pat. No. 11,649,777.

(Continued)

(51) Int. Cl.
*F02D 41/06* (2006.01)
*F02B 37/12* (2006.01)
(Continued)

(52) U.S. Cl.
CPC ............ *F02D 41/062* (2013.01); *F02B 37/12* (2013.01); *F02D 41/0002* (2013.01);
(Continued)

(58) Field of Classification Search
CPC .... F02P 5/142; F02P 5/1506; F02M 21/0227; F02M 31/135; F02M 31/16; F02D 19/023;
(Continued)

(56) References Cited

U.S. PATENT DOCUMENTS

| 2,543,791 A | 3/1951 | Malin |
| 2,591,687 A | 4/1952 | Du et al. |

(Continued)

FOREIGN PATENT DOCUMENTS

| DE | 102010020795 A1 | 1/2011 |
| EP | 2233433 A1 | 9/2010 |

(Continued)

OTHER PUBLICATIONS

Notification of Grant dated Sep. 28, 2023 for associated Chinese Patent Application No. 201880061298.3 (1 page).

(Continued)

*Primary Examiner* — Carl C Staubach
(74) *Attorney, Agent, or Firm* — Nathan P. Letts; Olive Law Group PLLC

(57) ABSTRACT

An internal combustion engine is operated at fuel-rich conditions by adjusting one or more operating parameters such as, for example, a throttle, an ignition timing, a load coupled to the engine, a fuel pressure, power to a supercharger, and power to a preheater to maintain a specified engine speed and a temperature of an exhaust gas. Operating the engine under these conditions allows the engine to function as a reformer producing a synthesis gas comprising hydrogen and carbon monoxide.

26 Claims, 7 Drawing Sheets

Related U.S. Application Data

(60) Provisional application No. 62/565,844, filed on Sep. 29, 2017.

(51) Int. Cl.
   *F02D 41/00* (2006.01)
   *F02D 41/14* (2006.01)
   *F02M 31/16* (2006.01)
   *F02P 5/14* (2006.01)

(52) U.S. Cl.
   CPC ..... *F02D 41/1446* (2013.01); *F02D 41/1454* (2013.01); *F02M 31/16* (2013.01); *F02P 5/142* (2013.01); *F02D 2200/023* (2013.01); *F02D 2200/0602* (2013.01); *F02D 2200/10* (2013.01)

(58) Field of Classification Search
   CPC ....... F02D 2200/023; F02D 2200/0602; F02D 2200/10; F02D 41/0002; F02D 41/0027; F02D 41/062; F02D 41/1446; F02D 41/1454; F02D 41/1475; F02B 37/12
   See application file for complete search history.

(56) References Cited

U.S. PATENT DOCUMENTS

| | | |
|---|---|---|
| 2,846,297 A | 8/1958 | Herwig |
| 2,922,809 A | 1/1960 | Oberdorfer, Jr. |
| 3,760,785 A * | 9/1973 | Harrison ............ F02M 3/07 123/DIG. 11 |
| 4,275,865 A * | 6/1981 | Turner ............ F02M 41/1411 251/63 |
| 4,409,196 A | 10/1983 | Skinner |
| 6,397,790 B1 | 6/2002 | Collier, Jr. |
| 7,220,505 B2 | 5/2007 | Malhotra et al. |
| 7,550,215 B2 | 6/2009 | Malhotra et al. |
| 7,989,509 B2 | 8/2011 | Allam |
| 8,445,549 B2 | 5/2013 | Allam |
| 8,508,209 B2 | 8/2013 | Wang et al. |
| 9,169,773 B2 | 10/2015 | Bromberg et al. |
| 10,465,631 B2 | 11/2019 | Lissianski et al. |
| 2004/0103860 A1 | 6/2004 | zur Loye et al. |
| 2008/0274021 A1 | 11/2008 | Neels et al. |
| 2009/0282812 A1 | 11/2009 | Hu |
| 2011/0223100 A1 | 9/2011 | Monereau |
| 2014/0144397 A1 | 5/2014 | Bromberg, III et al. |
| 2015/0034045 A1 | 2/2015 | Reitz et al. |
| 2016/0245239 A1 | 8/2016 | Henry |
| 2016/0333842 A1 | 11/2016 | Sunley et al. |
| 2017/0024275 A1 | 1/2017 | Grimsrud et al. |
| 2019/0249626 A1* | 8/2019 | Asai ............ F02D 19/0671 |
| 2019/0293012 A1 | 9/2019 | Asai |
| 2020/0131984 A1* | 4/2020 | Roychoudhury ...... F02M 25/00 |

FOREIGN PATENT DOCUMENTS

| | | |
|---|---|---|
| JP | 1994219706 | 8/1994 |
| JP | H06219707 A | 8/1994 |
| JP | 852113423 A | 9/1997 |
| JP | 2011162372 A | 8/2011 |
| RU | 2299175 C1 | 5/2007 |
| RU | 2343109 C2 | 1/2009 |
| RU | 2395914 C2 | 7/2010 |
| RU | 2011153039 A | 7/2013 |
| RU | 2015105188 A | 9/2016 |
| WO | 2007094702 A1 | 8/2007 |
| WO | 2013090166 A2 | 6/2013 |
| WO | 2014012629 A2 | 1/2014 |

OTHER PUBLICATIONS

"Factores de Emision de los Combustibles Colombianos". UPME. ACCEFYN. 26 pages (Jul. 2003).
International Report on Patentability from corresponding PCT/US2018/052367, dated Apr. 9, 2020 (9 pages).
International Search Report from corresponding PCT/US2018/052367, dated Mar. 26, 2019 (4 pages).
Wikipedia page entitled, "Internal combustion engine," retrieved Jan. 27, 2017 from "https://en.wikipedia.org/w/Index/php?title=internal_combustion_engine&oldid-800389798" (23 pages).
Decision of Refusal from associated Japanese Patent Application No. JP2020-511217 dated Jan. 24, 2023 (10 pages).
Emmanuel G. Lim; Emmanuel G. Lim's Master's Thesis entitled "The Engine Reformer: Syngas Production in Engines Using Spark-Ignition and Metallic Foam Catalysts," Massachusetts Institute of Technology, Master's Thesis, Jun. 2015.
Emmanuel Lim, et al., "The Engine Reformer: Syngas Production in an Engine for Compact Gas-To-Liquids Syntheses," Can. J. Chem. Eng.. 94:623-635, Mar. 1, 2016.
European Extended Search report from associated European Application No. 18860405.2 dated May 26, 2021 (8 pages).
Examination Report from associated Indian Patent Application No. 2020170034083 dated Feb. 28, 2022 (7 pages).
Examination Report from associated Philippine Patent Application No. 1-2020-500223 dated Aug. 5, 2022 (6 pages).
Factores de Emision de los Combustibles Colombianos. UPME. ACCEFYN. Machine Translation, 26 pages (Jul. 2003).
Loayza, Y., et al. "Control del sistema de inyeccion de un motor a gasolina". University of Azuary. 142 pages (2005).
Loayza, Y., et al. "Control del sistema de inyeccion de un motor a gasolina". University of Azuary. Machine Translation, 142 pages (2005).
Machine translation of Office Action from associated Columbian Patent Application No. NC2020/0002404 dated Jan. 14, 2022.
Notice of Deficiencies from associated Israeli Patent Application No. 273222 dated Sep. 12, 2022 with translation (5 pages).
Notification of Reasons for Refusal from associated Japanese Patent Application No. 2020-511217 dated Oct. 4, 2022 (6 pages).
Office Action from associated Chinese Patent Application No. 201880061298.3 dated Nov. 15, 2021 (2 pages).
Office Action from associated Chinese Patent Application No. 2018800612983 dated Mar. 18, 2022 (11 pages).
Office Action from associated Colombian Patent Application No. NC2020/0002404 dated Jul. 26, 2021 (6 pages).
Office Action from associated Columbian Patent application No. NC2020/0002404 dated Jan. 14, 2022 (9 pages).
Office Action from associated Egyptian Patent Application No. 280/2020 dated Feb. 27, 2022 (2 pages).
Office Action from associated Egyptian Patent Application No. 280/2020 dated Oct. 20, 2022 (10 pages).
Office Action from associated Korean Patent Application No. 10-2020-7006017 dated Nov. 7, 2022 with translation (14 pages).
Office Action from associated Russian Patent Application No. 2020103223 dated Feb. 28, 2022 (8 pages).
Office Action from associated Russian Patent Application No. 2020103397 dated Apr. 22, 2022 (4 pages).
Office Action from associated Saudi Arabian Patent Application No. 520411405 dated Jun. 23, 2022 (6 pages).
Office Letter from associated Colombian Patent Application No. 14359 dated Sep. 9, 2022 with machine translation (26 pages).
Search Report and Written Opinion from associated Brazilian Patent Application No. BR112020006081-0 dated Oct. 13, 2022 with translation (7 pages).
Search Report from associated Russian Patent Application No. 2020103397 dated Apr. 22, 2022 (2 pages).
Search Report from associated Russian patent application No. 2020103223 dated Feb. 28, 2022 (2 pages).
Subsequent Substantive Examination Report for associated Philippine Patent Application No. 1-2020-500223 dated Jan. 23, 2023 (4 pages).
Futang, Zhao, Automotive Electrical Equipment and Maintenance, China Radio and TV University Press, pp. 157-158 (Jan. 31, 2014)(14 pages).
Decision of Rejection for associated CN Patent Application No. 201880061283 dated May 25, 2023 (6 pages).

(56) References Cited

OTHER PUBLICATIONS

Translation of Decision of Rejection for associated CN Patent Application No. 201880061283 dated May 25, 2023 (6 bages).
European Office Action issued in related application EP 18860405.2 dated Jan. 4, 2024.
Indian Office Action issued in related application 202017004083 dated Feb. 1, 2024.
Japanese Office Action issued in related application JP2023116496 dated Jan. 31, 2024.
Lim et al. "The engine reformer: Syngas production in an engine for compact gas-to-liquids synthesis." The Canadian Journal of Chemical Engineering 94.4 (2016): 623-635.
Notice of Final Rejection dated Jun. 14, 2023 for associated Korean Patent Application No. 10-2020-7006017 (8 pages).

* cited by examiner

INTERNAL COMBUSTION ENGINE AS A CHEMICAL REACTOR TO PRODUCE SYNTHESIS GAS FROM HYDROCARBON FEEDS

RELATED APPLICATIONS

This application is a divisional of U.S. patent application Ser. No. 16/652,307, filed Mar. 30, 2020, which is a § 371 U.S. National Stage of International Application PCT/US18/52367, filed Sep. 28, 2018, which claims the benefit of U.S. Provisional Patent Application Ser. No. 62/565,844, filed Sep. 29, 2017, titled "INTERNAL COMBUSTION ENGINE AS A CHEMICAL REACTOR TO PRODUCE SYNTHESIS GAS FROM HYDROCARBON FEEDS," the content of which are incorporated herein by reference in their entireties.

FEDERALLY SPONSORED RESEARCH OR DEVELOPMENT

This invention was made with Government support under Grant No. DE-AR0000506 awarded by the U.S. Department of Energy. The government has certain rights in the invention.

TECHNICAL FIELD

The present invention generally relates to the production of synthesis gas, particularly using an internal combustion engine as a synthesis gas generator.

BACKGROUND

Many processes and operations produce gaseous streams of light hydrocarbons. Often these gaseous streams are at low pressure and may further comprise a variety of contaminants. Therefore, the gaseous streams may have little intrinsic value and the cost of removing contaminants and compressing the gas (such as to increase the pressure to allow introduction into a natural gas transmission pipeline) may be prohibitively expensive. Given these constraints, the gaseous streams are often disposed of by flaring, incinerating or venting.

Recently, there has been increased interest in making more productive use of these low quality hydrocarbon streams. One such area is using the hydrocarbon stream as a feed gas in synthesis gas (syngas) production. Syngas may be produced from partial combustion of organic feedstocks (light hydrocarbons, coal, petcoke, biomass, oil) and consists primarily of hydrogen ($H_2$) and carbon monoxide (CO). Syngas often contains contaminants (including $H_2S$, COS) depending on the starting raw material. Many syngas production processes utilize catalyst-based reformers to partially oxidize the organic feedstocks. Although catalysts are useful for increasing reaction rate and reducing reaction temperature, many catalysts are made from expensive materials, are subject to poisoning from sulfur compounds present in the gas stream, and clogging from soot and other particles.

Syngas is the starting material for production of a variety of chemicals. Syngas can also be used for power production in a gas turbine or an engine-based generator. Syngas can also be used to produce $H_2$, by converting the CO and water vapor to $H_2$ and carbon dioxide ($CO_2$) via the water-gas-shift (WGS) process. The $H_2$ to CO ratio of the process gas typically needs to be carefully adjusted to meet the downstream applications demand.

Recently, U.S. Pat. No. 9,169,773 (Bromberg et al.) disclosed a reformer-liquid fuel manufacturing system utilizing an engine to generate a hydrogen-rich gas. The systems disclosed operates at an air/fuel ratio, equivalence ratio, $2.5<\sigma<4.0$. They also disclose for an effective engine-based reformer one may use homogenous charge compression ignition (HCCI), partial pre-mixed compression ignition (PCI) or reaction controlled compression ignition (RCCI). They report that "In flowing burner flames as well as in cylinder calculations, lower equivalence ratios result in higher energy released in the conversion, higher peak in cylinder temperatures, lower selectivity to hydrogen and CO . . . ."

U.S. Pat. No. 2,391,687 (Eastman et al.) discloses an engine for the generation of syngas which runs on 90% or greater pure $O_2$ and has an equivalence ratio of 2.8-4.0.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a method for using an internal combustion engine under fuel-rich conditions includes: starting the engine using a feed gas having an initial fuel-air equivalence ratio; increasing the fuel-air equivalence ratio incrementally to generate a fuel-rich feed gas; and while increasing the fuel-air equivalence ratio, adjusting one or more of a throttle, an ignition timing, a load coupled to the engine, a fuel pressure, power to a supercharger acting on the feed gas, and power to a preheater acting on the feed gas to maintain a fuel-air equivalence ratio of about 1.6 to 2.4. In one embodiment, an engine speed between about 1000 to 2000 rotations per minute (RPM) and a temperature of an exhaust gas less than about 900° C. is maintained.

According to another embodiment, a method for operating an internal combustion engine under fuel-rich conditions includes: maintaining an initial set of conditions after startup of the engine for an exhaust backpressure, an intake manifold pressure, an engine speed, an ignition timing, a fuel gas fuel-air equivalence ratio, and a fuel gas inlet temperature; increasing the fuel gas inlet temperature while maintaining the fuel gas fuel-air equivalence ratio, and monitoring methane and oxygen content of an engine exhaust gas; and adjusting ignition timing in response to the monitored methane and oxygen content.

According to another embodiment, a gas reformer system is configured for performing any of the methods disclosed herein.

According to another embodiment, a gas reformer system includes: an internal combustion engine comprising a fuel gas inlet, an exhaust gas outlet, a plurality of cylinders, an ignition timing system, a throttle, a fuel gas preheater, and a supercharger, wherein the internal combustion engine is configured for operating with a fuel gas fuel-air equivalence ratio of between about 1.6 and 2.4.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
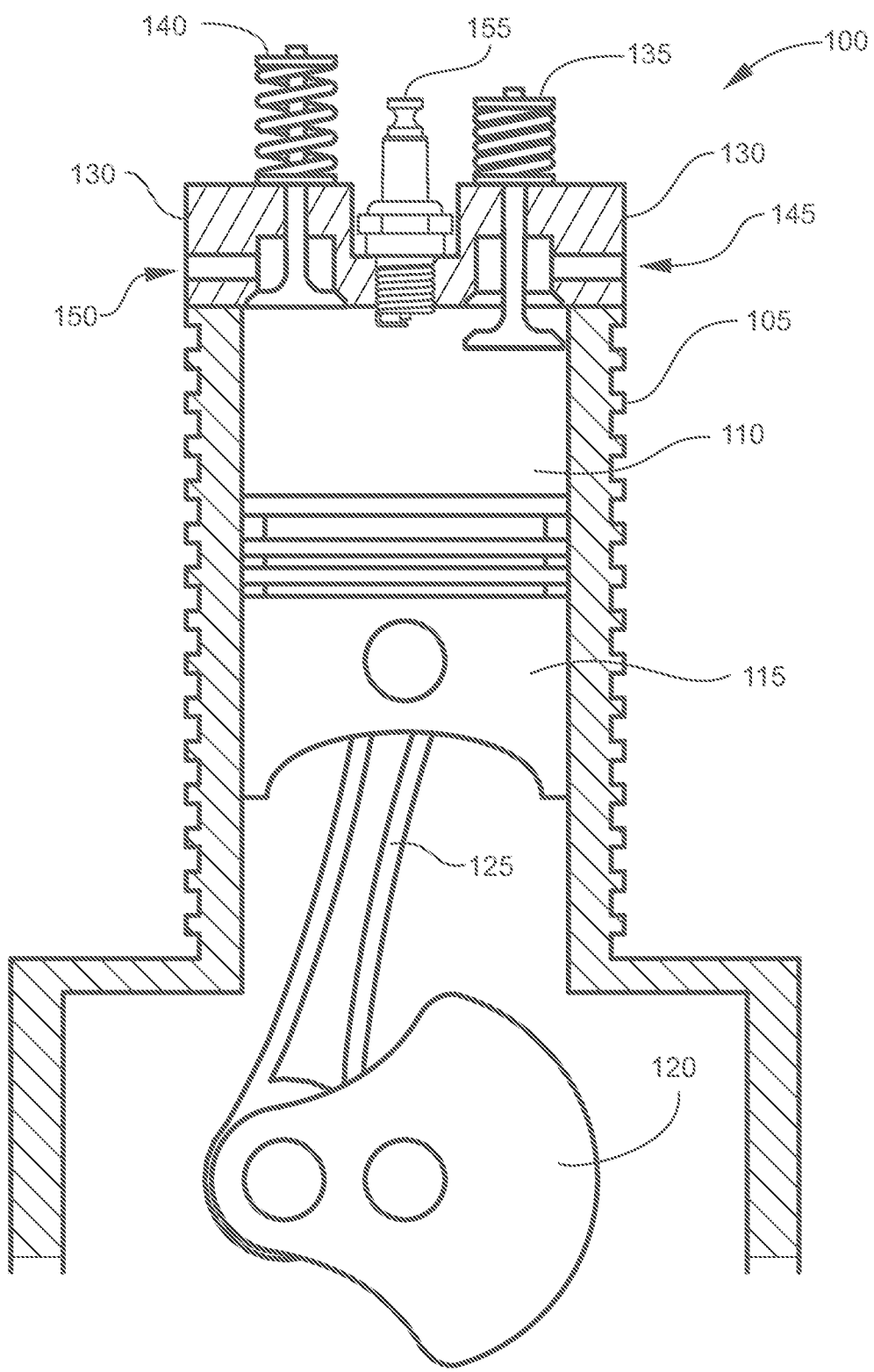
FIG. 1 is a cross-sectional schematic view of an exemplary cylinder of an internal combustion engine according to some embodiments.

As used herein, the term "syngas" refers to synthesis gas. In the context of the present disclosure, syngas is a mixture of at least carbon monoxide (CO) and diatomic hydrogen gas ($H_2$). Depending on the embodiment, syngas may additionally include other components such as, for example, water, air, diatomic nitrogen gas ($N_2$), diatomic oxygen gas ($O_2$), carbon dioxide ($CO_2$), sulfur compounds (e.g., hydrogen sulfide ($H_2S$), carbonyl sulfide (COS), sulfur oxides ($SO_x$), etc.), nitrogen compounds (e.g., nitrogen oxides ($NO_x$), etc.), metal carbonyls, hydrocarbons (e.g., methane ($CH_4$)), ammonia ($NH_3$), chlorides (e.g., hydrogen chloride (HCl)), hydrogen cyanide (HCN), trace metals and metalloids (e.g., mercury (Hg), arsenic (As), selenium (Se), cadmium (Cd), etc.) and compounds thereof, particulate matter (PM), etc.

As used herein, the term "lower hydrocarbon" refers to hydrocarbons of a low molecular weight, including but not limited to methane, ethane, propane and butane.

As used herein, the term "load" may mean an electric heater, dynamometer, water bath, etc. By increasing or decreasing load, the engine may be run at constant speed as input conditions are varied. One may also vary the load to modify the temperature within the engine or the output component ratios.

As used herein, the term "natural gas" refers to a mixture of hydrocarbon (HC) gases consisting primarily of methane and lesser amounts of higher alkanes. Depending on the embodiment, natural gas may additionally include non-HC species such as one or more of those noted above, as well as carbon disulfide ($CS_2$) and/or other disulfides, and mercaptans (thiols) such as methanethiol ($CH_3SH$) and ethanethiol ($C_2H_5SH$), and thiophenes such as thiophene ($C_4H_4S$) and other organosulfur compounds.

The present disclosure provides methods for utilizing an internal combustion engine as a syngas generator. Additionally, the process may be used in conjunction with methanol production, as well as other chemical production processes. The methods disclosed may make use of a wide variety of hydrocarbon sources dispersed throughout the world. For example, oil and natural gas production wells are located in many remote areas of the U.S., and each individual well, compressor, pneumatic device, and storage vessel at the well may produce a hydrocarbon emission stream. Due to the small volume, low pressure, and potential contaminates of these hydrocarbon streams, they are often flared or vented. Compressing and purifying these disparate streams for collection into a natural gas transmission pipeline may be prohibitively expensive. The methods of the present disclosure may utilize mass-produced internal combustion engines operated under specified conditions to partially oxidize these hydrocarbons and produce syngas which may have a higher value and make collection of the syngas economically feasible.

Internal combustion engines have been developed and utilized for decades to produce power typically either for the propulsion of vehicles, drive mechanical devices, or generate electricity. In each of these uses, the focus has been on the efficient and complete combustion of a fuel to maximize the power produced. Internal combustion engines however have characteristics of interest for other applications. Characteristics such as heat management from the coolant and radiator system for controlling the engine temperature, the ability to create high pressures in the cylinder, the function of short residences times in the cylinder, and the control of valve pressures can all be used in processes for chemical conversions where the engine would serve as a chemical reactor. In this application, the focus becomes on controlling the engine parameters to maximize the desired chemical conversion as opposed to power generation. In some instances, the chemical reaction may create power. Alternatively, power may be added by externally turning the shaft in other instances. Any chemical reaction operating on short residence time and taking advantage of the characteristics listed above could potentially be adapted to using the engine as a chemical reactor. Here we describe one such application for the conversion of light hydrocarbons to syngas.

FIG. 1 illustrates a cross-sectional schematic view of one cylinder 105 of an internal combustion engine 100 according to various embodiments. The engine 100 may further comprise a combustion chamber 110 within the cylinder 105. A piston 115 may be positioned within the cylinder 105 and move up and down in the cylinder 105, thereby defining a variable volume of the combustion chamber 110. The combustion chamber 110 is at its minimum volume when the piston 115 is at its highest position in the cylinder 105 (referred to as top dead center (TDC)), and at its maximum volume when the piston 115 is at its lowest position in the cylinder 105 (referred to as bottom dead center (BDC)). The piston 115 may be coupled to a crankshaft 120 by a connecting rod 125. The engine 100 may further comprise a head 130 coupled to the top of the cylinders 105. The head 130 may house one or more intake valves 135 and one or more exhaust valves 140. Each intake valve 135 may serve to open or close an inlet port 145, while each exhaust valve 140 may serve to open or close an exhaust port 150. The inlet port 145 may be in fluid communication with the combustion chamber 110 to allow a mixture of fuel and oxidizer (referred to as the charge) to flow into the combustion chamber 110. The exhaust port 150 may also be in fluid communication with the combustion chamber 110 to allow exhaust gases to flow out of the combustion chamber 110. The head 130 may also comprise one or more spark plugs 155 that may extend at least partially into the combustion chamber 110 and provide an ignition source for the charge.

Although not shown in FIG. 1, the engine 100 may further comprise a preheater to increase a temperature of one or both of the fuel and oxidizer prior to entering the intake port 145, and a supercharger to increase a pressure of one or both of the fuel and oxidizer prior to entering the intake port 145. The preheater may comprise a heat exchanger to extract a portion of the heat, for example, of the exhaust gases from the engine 100. Alternatively, the preheater may obtain heat energy by other processes known in the art such as from electrically powered heaters, combustion of a secondary fuel, or scavenging heat from another process. The supercharger may comprise a turbine to extract energy from the exhaust gases from the engine 100. Alternatively, the supercharger may be powered by other processes known in the art such as an electric motor or scavenging energy from another process.

In certain non-limiting embodiments, the engine 100 may be adapted to operate using a 4-stroke process. The 4-stroke process may begin, for example, with the piston 115 at TDC and then starting to move downward. The intake valve 135 moves down, thereby placing the intake port 145 in fluid communication with the combustion chamber 110. The piston 115 moves downward allowing the charge to enter the combustion chamber 110. As the piston 115 reaches BDC, the intake valve 135 closes. The piston 115 then moves upward, compressing the charge. As the piston 115 approaches TDC, the spark plug 155 generates a spark which ignites the charge. In various embodiments, as discussed further below, the spark may be generated prior to the piston 115 reaching TDC. As the charge burns, pressure within the combustion chamber 110 increases and forces the piston 115 downward. When the piston 115 reaches BDC, the exhaust valve 140 moves down, thereby placing the exhaust port 150 in fluid communication with the combustion chamber 110. As the piston 115 moves toward TDC, combustion gases from the burned charge are forced out of the exhaust port 150. When the piston 115 reaches TDC, the exhaust valve 140 closes and the cycle repeats.

Although the specifics of each process are not described herein, the engine 100 in various embodiments may be configured to operate according to a 2-stroke process, a 5-stroke process, a 6-stroke process, a compression ignition process (e.g., diesel), a jet engine, a turbine, a rotary engine, or any other engine type known in the art. The present disclosure focuses on a 4-stroke process because of its prevalence and ready availability, but no limitation on the scope of the disclosure should be inferred.

Typically, hydrocarbons and oxygen are the fuel and oxidizer, respectively, combusted in the engine 100. The general stoichiometric chemical equation for combustion of a hydrocarbon in oxygen is given by Equation 1:

$$C_xH_y + zO_2 \rightarrow xCO_2 + \frac{y}{2}H_2O \qquad \text{Eqn. 1}$$

Thus, for stoichiometric complete combustion, all of the hydrocarbon and oxygen react to form carbon dioxide and water. Thus, for stoichiometric complete combustion, a certain ratio of fuel to air is required. One measure of how the actual fuel-to-air ratio compares to the stoichiometric fuel-to-air ratio is the equivalence ratio (denoted as #). The equivalence ratio is calculated by dividing the actual fuel-to-air ratio by the stoichiometric fuel-to-air ratio. Equivalence ratio values greater than 1 indicate fuel-rich conditions.

An engine 100 operated according to stoichiometric complete combustion is typically operated to extract useful work and heat. However, various embodiments may comprise operating the engine 100 at other than stoichiometric conditions in order to utilize the engine 100 as a chemical reactor. Certain embodiments may utilize fuel-rich conditions (i.e., less than the stoichiometric amount of oxygen to combust all of the hydrocarbon) to partially oxidize the hydrocarbon. Without intending to be limited to a specific mechanism of action, under some conditions, the engine 100 may be operated as a reformer to produce synthesis gas (syngas) comprising hydrogen ($H_2$) and carbon Monoxide (CO) according to the chemical reaction given by Equation 2:

$$C_xH_y + \frac{x}{2}O_2 \rightarrow xCO + \frac{y}{2}H_2 \qquad \text{Eqn. 2}$$

If the hydrocarbon is methane ($CH_4$), then the partial oxidation reaction is given by Equation 3:

$$CH_4 + 0.5O_2 \rightarrow CO + 2H_2 \qquad \text{Eqn. 3}$$

Additionally, other reactions are envisioned to possibly take place as well such as complete combustion (Equation 1), reforming reactions such as Equations 4 and 5 (shown for methane), and other such known reforming and combustion reactions.

$$2CH_4 + O_2 + CO_2 \rightarrow 3CO + 3H_2 + H_2O \qquad \text{Eqn. 4}$$

$$4CH_4 + O_2 + 2\ H_2O \rightarrow 4CO + 10H_2 \qquad \text{Eqn. 5}$$

Figure 2:
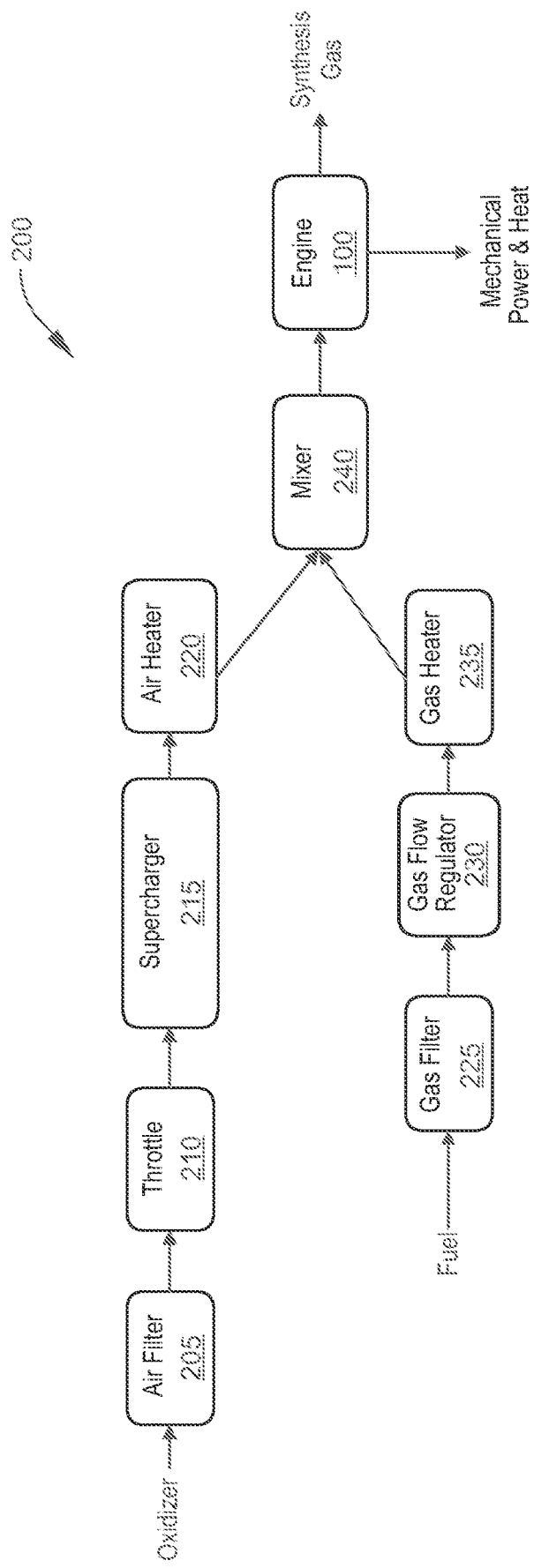
FIG. 2 is a schematic view of a system to produce synthesis gas using an internal combustion engine according to some embodiments.

FIG. 2 is a schematic diagram of a process 200 according to various embodiments in which the combustion engine 100 may be utilized as a chemical reactor to produce, for example, syngas. As discussed previously, the charge to the engine 100 may comprise an oxidizer and a fuel. The oxidizer may comprise air, enriched air, or a gas containing sufficient oxygen. The oxidizer may pass through a filter 205 to remove particulates and other solid contaminates, as well as liquid or gaseous contaminates such as water. The oxidizer flow may be controlled by a throttle 210. The throttle 210 may comprise any flow regulating device known in the art, and may be manually or electronically controlled. A pressure of the oxidizer may be increased by a supercharger 215. The supercharger 215 acts as a compressor to increase pressure, thereby allowing more oxygen to be delivered to each cylinder 105 of the engine 100. The supercharger 215 may be driven by an electric motor, or may be otherwise powered, such as by utilizing residual energy in the exhaust stream of the engine 100 or another process stream. The oxidizer may also pass through a heater 220 to increase the temperature of the oxidizer prior to entering the engine 100. The heater 220 may utilize electrically powered heating coils, or a heat exchanger that extracts energy from a process stream, such as the exhaust stream of the engine 100 (see, for example, FIG. 4). The fuel may also pass through a filter 225 to remove solid, liquid, or gaseous contaminates, and through a flow regulator 230. The temperature of the fuel stream may be increased by a heater 235 operated similarly to the oxidizer heater 220. A mixer 240 may mix the oxidizer and fuel in a desired ratio to form the charge delivered to each cylinder 105 of the engine 100. The engine 100 may then partially oxidize the charge as described previously, producing syngas in the exhaust stream. Operation of the engine 100 may also produce mechanical power and heat.

In various embodiments, the process 200 may further comprise a central processing unit (not shown). The central processing unit may be in communication with and capable of activating and controlling one or more of the individual components of the process 200. The central processing unit may be capable of storing and executing computer code to initiate operation of the process 200 in response to monitored operating conditions of the engine 100 and analysis of the syngas produced by the engine 100. For example, the ratio of $H_2$ to CO in the exhaust stream of the engine 100 may be monitored, and the central processing unit may adjust one or more of the individual components of the process 200 in response to the monitored $H_2$ to CO ratio. Additionally, the central processing unit may adjust one or more of the individual components of the process 200 in response to monitored parameters of the engine 100, such as combustion temperature in one or more cylinders 105, inlet pressure, exhaust pressure, and the like.

Figure 3:
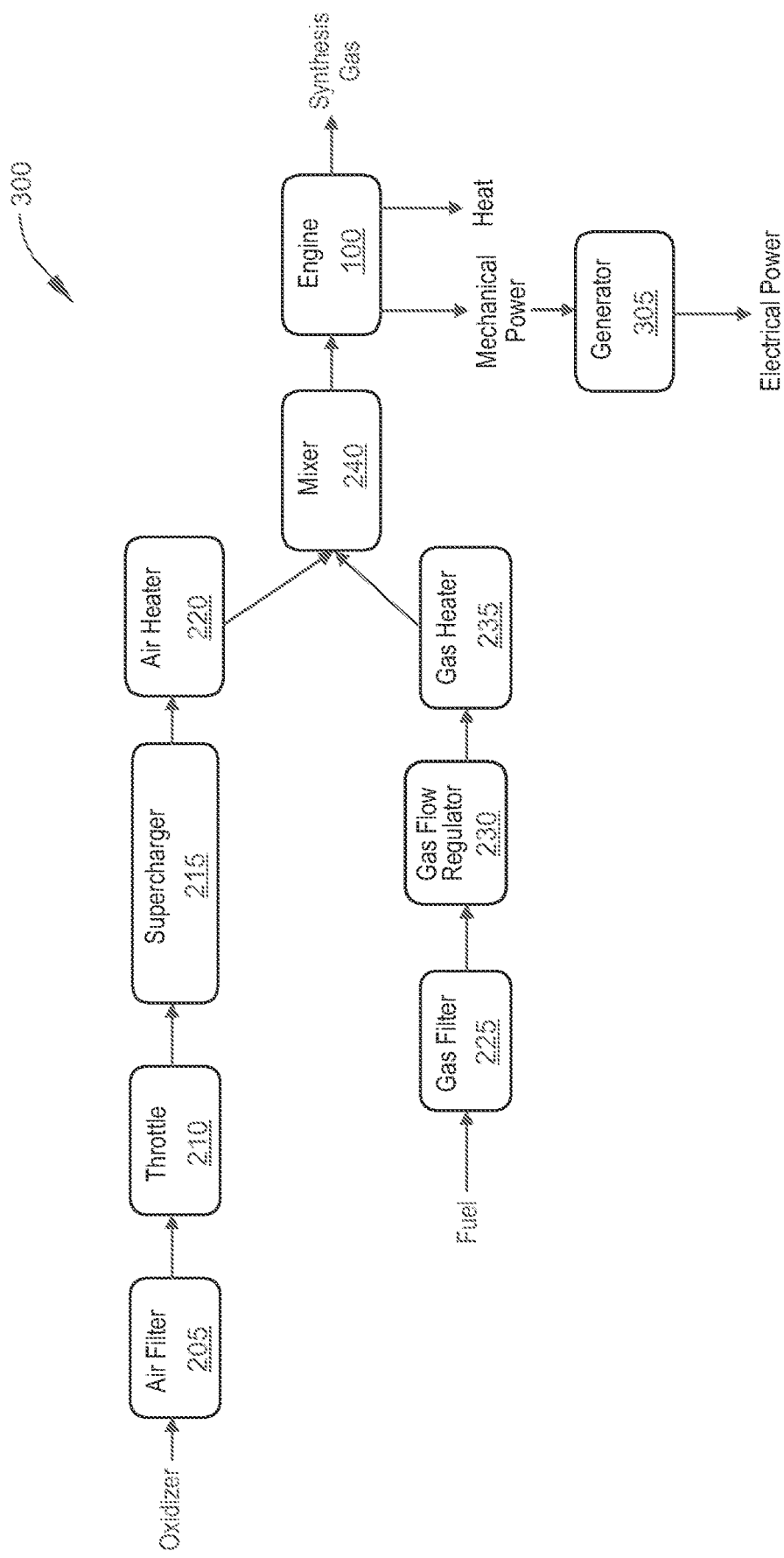
FIG. 3 is a schematic view of a system to produce synthesis gas using an internal combustion engine according to some embodiments.

FIG. 3 is a schematic diagram of a process 300 according to various embodiments in which a combustion engine 100 may be utilized as a chemical reactor to produce, for example, syngas. FIG. 3 illustrates that the engine 100 may be coupled to a generator 305 to convert mechanical power produced by the engine 100 to electrical power. The electrical power may be used to power the oxidizer heater 220, gas heater 235, or any other purpose.

Figure 4:
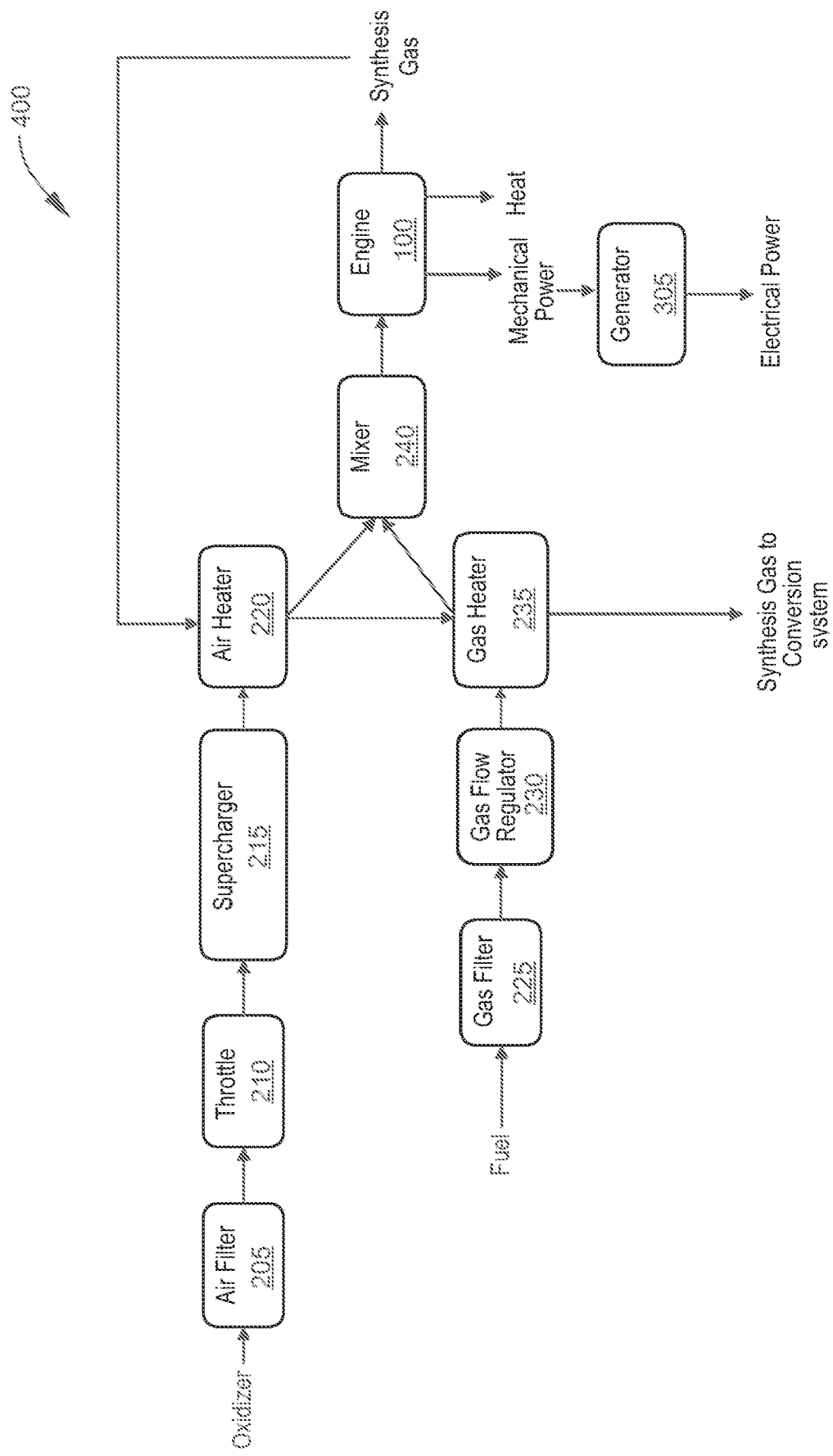
FIG. 4 is a schematic view of a system to produce synthesis gas using an internal combustion engine according to some embodiments.

FIG. 4 is a schematic diagram of a process 400 according to various embodiments in which a combustion engine 100 may be utilized as a chemical reactor to produce, for example, syngas. In process 400, residual heat in the syngas may be utilized to heat the oxidizer and the fuel. The oxidizer heater 220 and the fuel heater 235 may comprise heat exchangers in order to transfer heat from the syngas to the oxidizer and fuel streams. The heat exchangers may be any type known in the art, such as shell and tube, plate and shell, and plate fin and may operate in, for example, a parallel-flow, counter-flow, or cross-flow configuration.

Engines 100 operated under fuel-rich conditions may be susceptible to abnormal combustion known as detonation or knocking. Knocking occurs when a pocket of the charge ignites outside of a flame front created by the spark and can cause pressure within the cylinder 105 to rise beyond design limits. This increase in pressure has the potential to tear holes in the piston 115 or head 130, leading to catastrophic failure of the engine 100.

Figure 5:
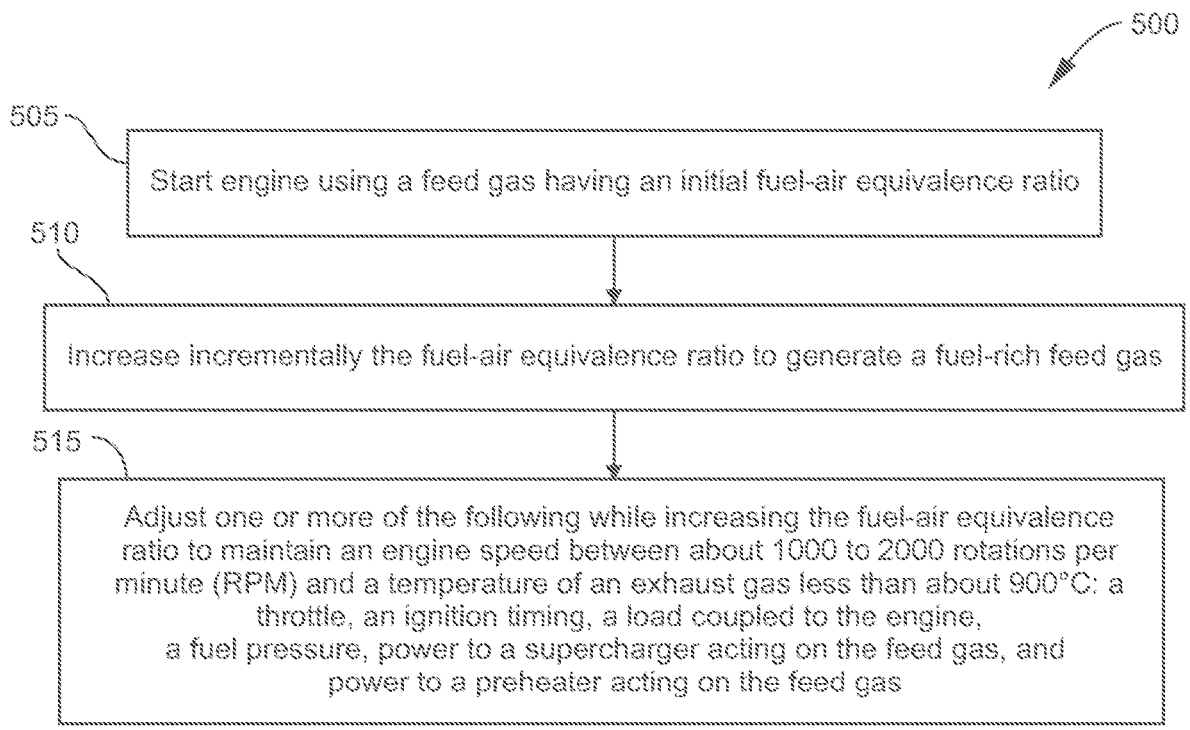
FIG. 5 is an exemplary flowchart of a method for starting an engine under fuel-rich conditions according to some embodiments.

Various embodiments comprise methods to start up the engine 100 to reach operation at fuel-rich conditions and subsequently operate under steady-state conditions without (or with minimal) knocking. FIG. 5 illustrates a general flowchart of various embodiments of a method 500 for starting the engine 100 to reach operation at fuel-rich conditions. The engine 100 may be started using a feed gas having an initial fuel-air equivalence ratio at step 505. The fuel-air equivalence ratio may be increased incrementally at step 510 to generate a fuel-rich feed gas. At step 515, one or more of the following may be adjusted while increasing the fuel-air equivalence ratio to maintain an engine speed between about 1000 to 2000 RPM and a temperature of an exhaust gas less than about 900° C.: the throttle 210, an ignition timing, a load coupled to the engine 100, a fuel pressure, power to the supercharger 215 acting on the feed gas, and power to the preheater 220, 235 acting on the feed gas.

Prior to starting the engine 100, initial operating conditions may be set such that a fuel pressure is a value typically lower than ambient pressure, the throttle 210 is partially opened to predetermined value, typically less than 50%, the ignition timing is set to a first predetermined value, and the load is coupled to the engine 100. In various embodiments, the ignition timing determines when a spark is generated by the spark plug 155 and is measured with respect to a rotational position of the crankshaft 120 when the piston 115 is at TDC. The ignition timing, in general, may be advanced to generate the spark prior to the piston 115 reaching TDC. Advancing the ignition timing allows combustion (or the desired amount of partial combustion) of the charge to be completed close to the point where the piston 115 reaches TDC. The ignition timing is typically expressed as the degrees of rotational movement of the crankshaft 120 prior to the piston 115 reaching TDC, or simply degrees before top dead center (BTDC). In various embodiments, the first predetermined ignition timing value may be approximately 8 degrees BDTC, or approximately 5 to approximately 15 degrees BDTC. In other embodiments, the first predetermined ignition timing value may be up to approximately 30 degrees BDTC.

After initiating starting the engine 100 and allowing the engine 100 to turn over for a short period of time until the engine fires, the fuel pressure may be increased typically to near ambient pressure to allow the engine 100 to run on its own. The engine speed should be monitored after starting. The ignition timing may be gradually advanced to a second predetermined value while adding load to maintain the engine speed between approximately 1000 to 2000 RPM. The second predetermined ignition timing value may be approximately 16 degrees BTDC. In other embodiments, the second predetermined ignition timing value may range from approximately 8 degrees to approximately 28 degrees BTDC, preferably between approximately 10 and approximately 20 degrees BTDC.

As discussed previously, the supercharger 215 may be powered in certain embodiments by an electric motor. In such embodiments, the supercharger 215 may be initially powered, and then power may be incrementally increased while incrementally increasing the fuel pressure to maintain the engine speed between approximately 1000 to 2000 RPM. In various embodiments, the supercharger 215 may be initially powered at an initial predetermined value, typically a setting that supplies air similar to naturally aspirating the engine, and incrementally increased to a second predetermined value by increments that are approximately 10% to 15% of the range between those settings. In various embodiments, the fuel pressure may be incrementally increased by approximately 0.1 in. $H_2O$, though larger increments may be used.

The throttle 210 may be increased incrementally from the initial setting using increments that grow from 1% up to 10% until a final throttle position approximately 90% open is reached. While increasing the throttle 210, the fuel pressure may be increased in order to maintain the engine speed between approximately 1000 to 2000 RPM. If the performance of the engine 100 drops rapidly while adding fuel pressure, then the fuel-air mixture may be too rich. In this situation, fuel pressure may be decreased and load used to control engine speed. A temperature of the exhaust gases may also be monitored and should be maintained at less than 900° C. by modifying one or more of the fuel pressure, the throttle 210, and the engine load.

The preheaters 220, 235 may be initially powered such that the preheaters 220, 235 maintain the temperature of the charge at approximately 200° C. prior to entering the intake port 145. The ignition timing may then be advanced further BTDC. As is known in the art, the optimal ignition timing and specific process for advancing the ignition timing will depend on many factors including without limitation fuel conditions (temperature, pressure, presence of contaminants, etc.), timing of fuel injection, type and condition of ignition system, engine speed, engine load and the specific type of engine used. The power to the supercharger 215 may be incrementally increased to increase the air feed rate. As the supercharger power is increased and as the preheaters 220, 235 heat up, the engine speed may be maintained between approximately 1000 to 2000 RPM by adjusting the fuel pressure and the load. Once a desired engine throughput is achieved, the supercharger power increases may be discontinued.

Once the preheaters 220, 235 reach approximately 200° C., the preheater temperature may be increased in predetermined increments typically no more than 15% of the setting to avoid overshooting the set temperature. As is known in the art, the use of automated control systems may allow for larger temperature increments without increasing the risk of overshooting the set temperature. The fuel pressure may be adjusted to maintain the engine speed between about 1000 to 2000 RPM while the preheater temperature increases. Once the desired fuel-air equivalence ratio is obtained, further increases in the preheater temperature may be discontinued. In various embodiments, the desired fuel-air equivalence ratio may be approximately 1.6 to 2.4.

If the engine 100 suddenly loses stability while increasing the preheater temperature, an operational temperature within the cylinder 105 may be too high for the present fuel-to-air ratio at the present manifold pressure. In this situation, the power to the preheaters 220, 235 may be turned off until stability is regained, and then the power to the preheaters 220, 235 may be turned back on, and ramping up of the preheater temperature and the fuel pressure may resume.

While air is often used to supply the oxidizer in the charge, enriched air (e.g., up to approximately 35 percent by volume $O_2$) may be used in various embodiments. The use of enriched air may increase engine throughput, reduce downstream costs per unit throughput, and improve liquid product collection and catalyst activity. Also humidified air or steam addition to the gas feed may be used. Increasing the humidity or adding additional steam increases the water vapor concentration in the cylinder enabling higher hydrogen yields through steam reforming reactions as described in Eqn. 5 above.

While methane is used here to describe the predominant fuel, a variety of hydrocarbon fuel compositions may be used in various embodiments. Operation of the system in many cases will utilize methane taken from natural gas pipelines, associated gas from oil wells, waste gas streams that would typically be flared, biogas streams, and other such gaseous light hydrocarbon streams. Pipeline natural gas is composed predominantly of methane but will have levels of ethane between 1 to 6% and traces of other hydrocarbons, carbon dioxide, nitrogen, and other molecules. Likewise, associated gas from oil wells will have high concentrations of ethane and higher hydrocarbons, typically referred to natural gas liquids, such as propane, butane, pentane, and hexane. In some instances, the natural gas liquids are collected before the remaining natural gas is collected for the pipeline, utilized, or flared. Operation of the engine to produce syngas could be run with either this fuel with or without removal of the natural gas liquids by tailoring the operation parameters to maintain conversion and avoid soot production. Another fuel stream for the engine could be gas streams from various chemical, manufacturing, or industrial processes or storage systems either as wastes or by-products and such fuels can have a variety of light hydrocarbons. When these streams have a high enough fuel concentration (depending on the fuel composition) or can be treated to achieve such concentrations, it is envisioned that these would be potential fuel sources for syngas production to utilize these streams. Additionally, there are many sources of biogas that can be used as fuel for the production of syngas utilizing an engine. For the purposes of the present invention, biogas is defined as the gaseous stream produced from degradation of biomass materials containing predominantly methane and carbon dioxide with other trace components known in the biogas field. Examples of sources of biogas are landfills, sites for treatment of animal wastes, and waste water treatment plants. In the uses of biogas, pretreatment may be required to remove some carbon dioxide (depending on concentration) from the fuel to effectively operate the engine, though complete removal is not required for engine operation. Engine operation is generally tolerant to the presence of carbon dioxide. As described in the natural gas composition, ethane is typically found in natural gas streams. Other embodiments may use additional ethane either as a fuel or blended with natural gas as a fuel. The addition of hydrogen to the fuel stream may also provide benefit in some embodiments with various fuel compositions. This hydrogen could be obtained from outside sources or recycled from the engine operation or downstream processes. One embodiment would be to either recycle hydrogen selectively removed from the engine exhaust gas or recycle a fraction of the engine exhaust.

Figure 6:
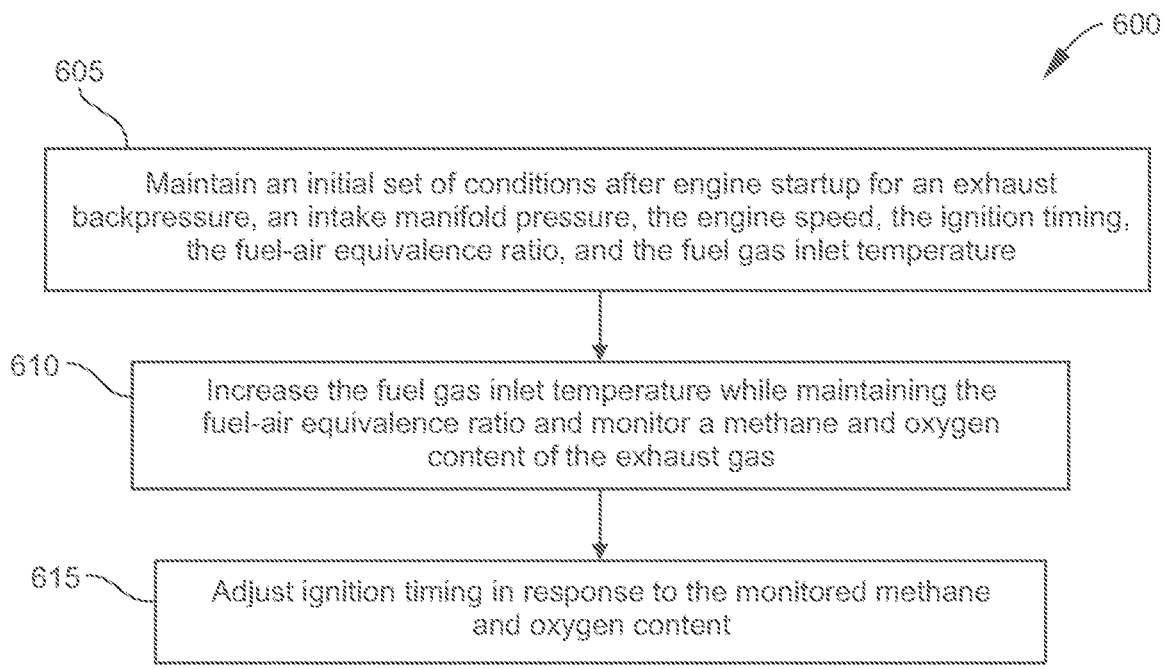
FIG. 6 is an exemplary flowchart of a method for operating an engine under fuel-rich conditions according to some embodiments.

Once startup of the engine 100 to reach fuel-rich conditions is achieved (such as by implementing, for example, the method described above in reference to FIG. 5), FIG. 6 illustrates another general flow diagram of various embodiments of a method 600 for continued operation of the engine 100 under fuel-rich conditions. At step 605, an initial set of operating conditions may be maintained after startup of the engine 100 for an exhaust backpressure, an intake manifold pressure, the engine speed, the ignition timing, the fuel gas fuel-air equivalence ratio, and the fuel gas inlet temperature. The fuel gas inlet temperature may be increased at step 610 by increasing power to the preheater while maintaining the fuel-air equivalence ratio. A methane and oxygen content (assuming methane is the hydrocarbon in the fuel) of the exhaust gas may be monitored. The ignition timing may be adjusted at step 615 in response to the monitored methane and oxygen content.

In various embodiments, the initial operating exhaust backpressure may be between approximately ambient to 5 bar absolute, the initial operating intake manifold pressure may be between approximately ambient to 2 bar absolute, the initial operating engine speed may be between approximately 1000-2000 RPM, the initial operating ignition timing may be between approximately 25 to 35 degrees BTDC, the initial operating fuel-air equivalence ratio may be between approximately 1.6 and 2.4, and the initial fuel gas temperature may be between approximately 200° C. and 270° C.

Figure 7:
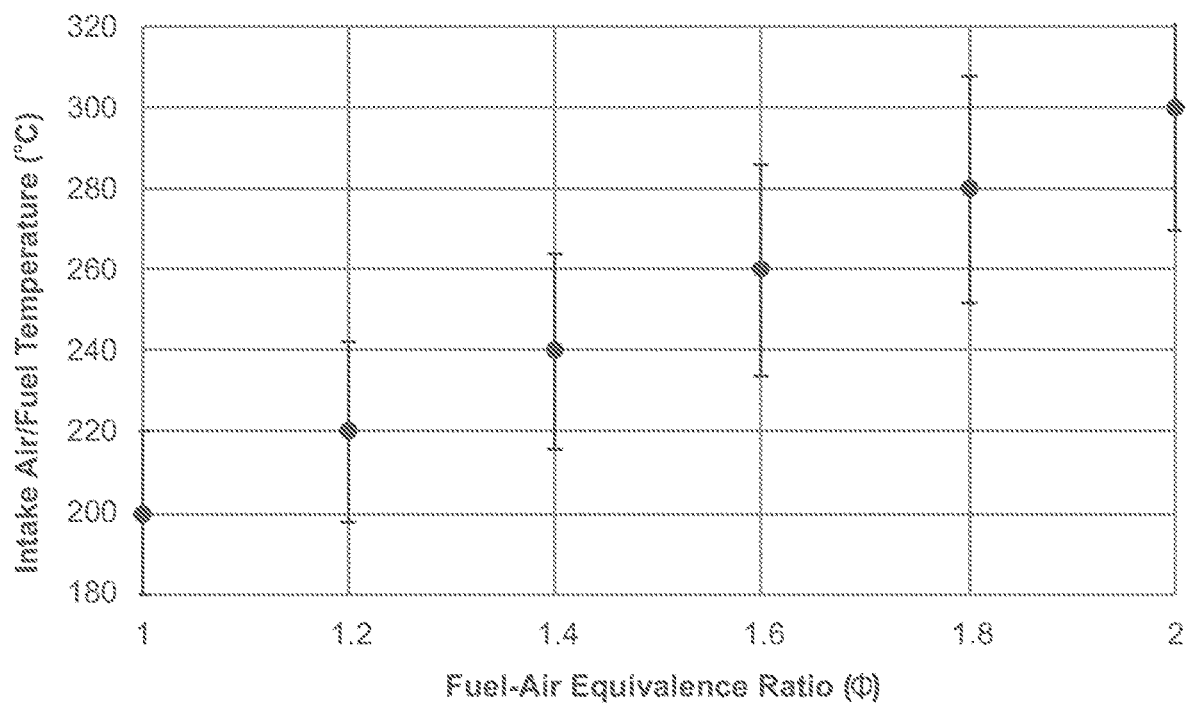
FIG. 7 is a graph of fuel-air intake temperature for various fuel-air equivalence ratios according to some embodiments.

FIG. 7 illustrates approximate fuel gas temperature ranges for fuel-air equivalence ratios ranging from 1 to 2.

In various embodiments, adjusting the ignition timing in response to the monitored methane and oxygen comprises monitoring methane and oxygen slippage (i.e., unreacted methane and oxygen passing through the engine 100). If the methane content in the exhaust gas or the oxygen content in the exhaust gas exceed acceptable levels, the ignition timing may be advanced to reduce the slippage. The exhaust gas temperature may be monitored while advancing the ignition timing so that the exhaust gas temperature remains within the range specified in FIG. 7. In various embodiments, rather than advancing the ignition timing of all the cylinders 105 of the engine 100 equally, ignition timing may be adjusted individually for each cylinder 105 such that variability of the temperature of the exhaust gas of each individual cylinder 105 is within a range of approximately 75° C.

Figure 8:
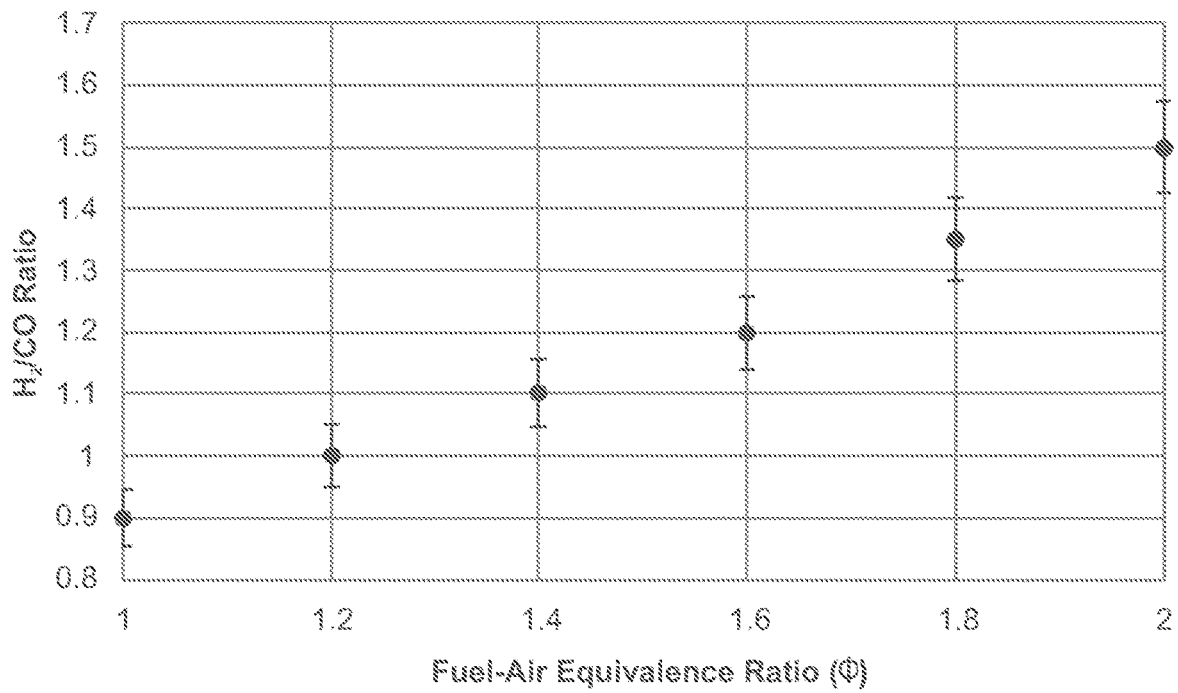
FIG. 8 is a graph of $H_2$ to CO ratios for various fuel-air equivalence ratios according to some embodiments.
Figure 9:
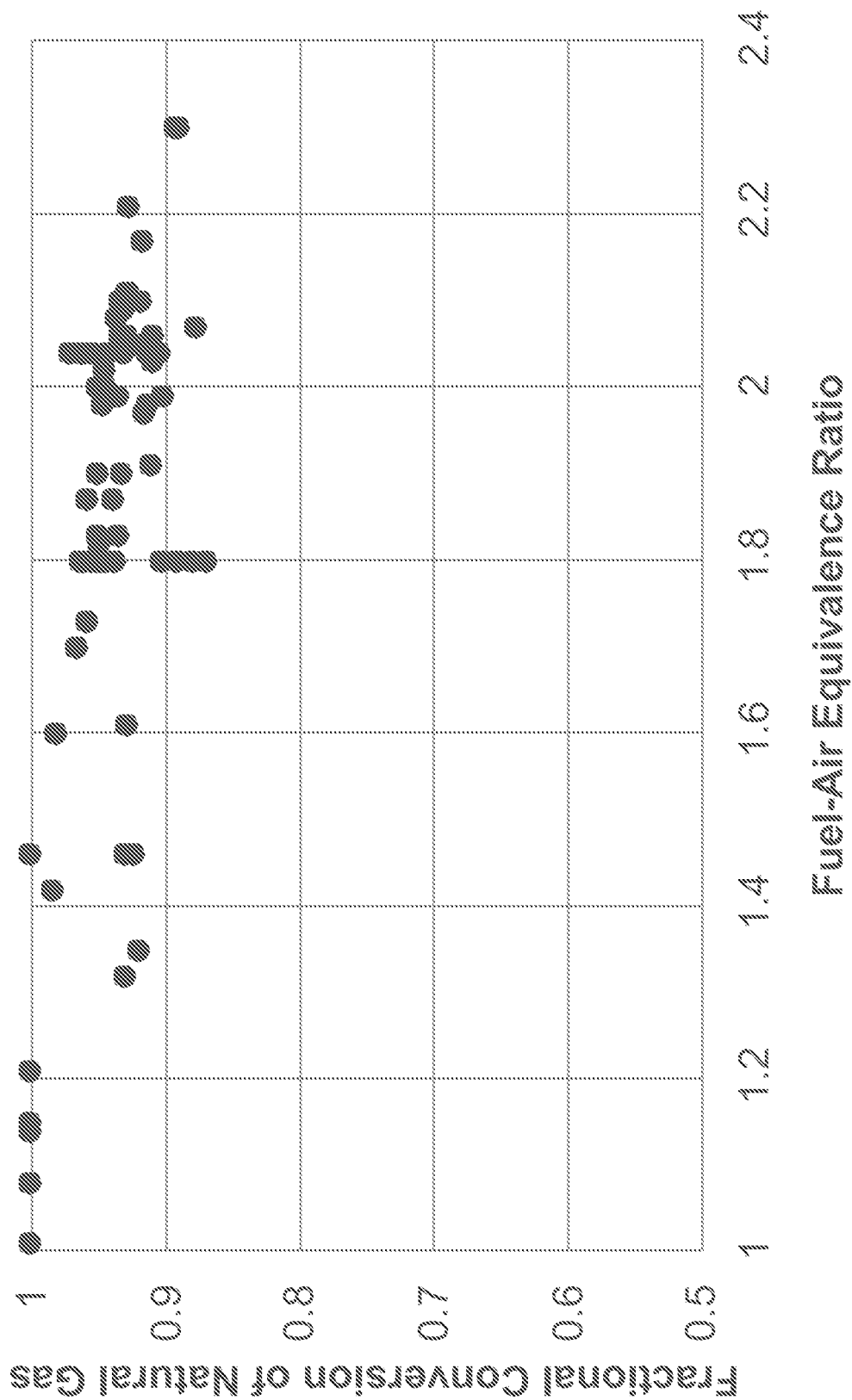
FIG. 9 is a graph of fractional conversion of natural gas for various fuel-air equivalence ratios according to some embodiments.

Under essentially steady-state operating conditions, FIG. 8 illustrates the expected ratio of $H_2$ to CO in the exhaust gas for a given fuel-air equivalence ratio. Thus, the engine 100 may be tuned to produce a desired $H_2$ to CO ratio as needed for downstream processes. FIG. 9 illustrates the fractional conversion of natural gas as the fuel for the engine 100 for a given fuel-air equivalence ratio. According to various embodiments, FIG. 8 may be used to determine the fuel-air equivalence ratio needed to produce a desired $H_2$ to CO ratio, and then FIG. 9 may be used to determine the expected fractional conversion of the fuel that may occur at the selected fuel-air equivalence ratio.

Example

An engine system was configured to produce syngas with natural gas sourced from the local utility natural gas pipeline. A commercially available 8-cylinder, 8.8 L spark-ignited engine was configured in a system to produce syngas with rich operation. Air was taken from the surrounding environment and a supercharger was used to boost the pressure to the inlet manifold pressure of near 2 bar. The natural gas was delivered from the utility pipeline meeting normal U.S. specifications for pipeline natural gas. The typical composition over the length of the runs described was 95 vol. % methane ($CH_4$), 4 vol. % ethane ($C_2H_6$), 1 vol. % carbon dioxide ($CO_2$) and unmeasured trace components. The air and natural gas mixtures were heated in excess of 200° C. prior to mixing. The mixed feed was then fed to the engine cylinders through the intake manifold. With the aid of spark-ignition, the feed was converted to a syngas in the cylinder. The engine was operated at a speed of 1500 RPM and exhaust gas temperatures were maintained below 900° C. The produced syngas was collected through the exhaust manifold and maintained at a pressure between 4 to 5 bar by use of downstream pressure regulation.

Table 1 presents the syngas composition (average of four runs) from this example with the operation of the engine 100 according to the present disclosure.

TABLE 1

| Syngas Composition | |
| --- | --- |
| Syngas Component | Volume Percent (dry) |
| $H_2$ | 22.3 |
| CO | 14.5 |
| $O_2$ | 0.15 |
| $CO_2$ | 2.9 |
| $CH_4$ | 1.3 |
| $N_2$ | 58.9 |

The above Example is for illustrative purposes only and does not restrict the invention to the processes used in the example.

In general, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for using an internal combustion engine as a reactor under fuel-rich conditions, comprising:
 starting the engine using a feed gas having an initial fuel-air equivalence ratio wherein the feed gas comprises natural gas;
 increasing the fuel-air equivalence ratio incrementally to generate a fuel-rich feed gas; and
 while increasing the fuel-air equivalence ratio, adjusting one or more of a throttle, an ignition timing, a load coupled to the engine, a fuel pressure, power to a supercharger acting on the feed gas or part of the feed gas, and power to a preheater acting on the feed gas to maintain a fuel-air equivalence ratio to about 1.6 to 2.4.

2. The method of claim 1, wherein the feed gas comprises hydrocarbon compounds and an oxygen containing stream.

3. The method of claim 1, further comprising setting initial conditions prior to starting the engine as at least one of predetermined fuel pressure, partially open throttle, a first predetermined ignition timing value, and a load coupled to the engine.

4. The method of claim 3, wherein setting the partially open throttle comprises setting the throttle at a predetermined setting below 50%.

5. The method of claim 3, wherein setting the first predetermined ignition timing value comprises setting the ignition timing from about 5 to about 12 degrees before top dead center (BTDC).

6. The method of claim 1, wherein starting the engine comprises setting the fuel pressure to about 0 in. H2O gauge and allowing the engine to start.

7. The method of claim 1, wherein an engine speed between about 1000 to 2000 rotations per minute (RPM) and a temperature of an exhaust gas less than about 900° C. is maintained.

8. The method of claim 1, wherein adjusting the ignition timing comprises advancing the ignition timing to a second predetermined value while increasing the engine load to maintain the engine speed between about 1000 to 2000 RPM.

9. The method of claim 8, wherein the ignition timing second predetermined value is between about 8 degrees BTDC and about 28 degrees BTDC.

10. The method of claim 1, wherein adjusting the power to the supercharger comprises initially powering the supercharger.

11. The method of claim 10, further comprising increasing the power to the supercharger while increasing the fuel pressure to maintain the engine speed between about 1000 to 2000 RPM.

12. The method of claim 1, wherein adjusting the throttle comprises increasing the throttle while increasing the fuel pressure and the engine load to maintain the engine speed between about 1000 to 2000 RPM.

13. The method of claim 1, further comprising monitoring the exhaust gas temperature and modifying one or more of the fuel pressure, the throttle, and the engine load to maintain the exhaust gas temperature less than about 900° C.

14. The method of claim 1, wherein adjusting the power to the preheater comprises initially powering the preheater.

15. The method of claim 14, further comprising setting the preheater to an initial temperature, and raising the fuel pressure as the preheater temperature increases while maintaining the engine speed between about 1000 to 2000 RPM.

16. The method of claim 15, wherein the preheater initial temperature is about 200° C.

17. The method of claim 8, further comprising adjusting the ignition timing to a third predetermined value.

18. The method of claim 17, wherein the ignition timing third predetermined value is from about 20 to about 30 degrees BTDC.

19. The method of claim 11, further comprising increasing the power to the supercharger while adjusting the fuel pressure and the engine load to maintain the engine speed between about 1000 to 2000 RPM until a desired engine volumetric throughput is reached.

20. The method of claim 15, further comprising when the preheater reaches the initial temperature, increasing the preheater temperature while adjusting the fuel pressure to maintain the engine speed between about 1000 to 2000 RPM until the fuel-air equivalence reaches about 1.6 to 2.4.

21. The method of claim 1, wherein the fuel gas initial fuel-air equivalence ratio is about 1.

22. A gas reformer system, comprising:
   an internal combustion engine comprising a fuel gas inlet, an exhaust gas outlet, a plurality of cylinders, an ignition timing system, a throttle, a fuel gas preheater, and a supercharger;
   wherein the internal combustion engine is configured for operating with (i) a natural gas fuel gas and (ii) a fuel-air equivalence ratio of between about 1.6 and 2.4.

23. The gas reformer system of claim 22, wherein the internal combustion engine is configured for individually adjusting a fuel gas fuel-air equivalence ratio, a fuel gas inlet temperature, an inlet manifold pressure, an ignition timing, an engine speed, an exhaust manifold pressure, and an exhaust gas temperature in order to operate with a fuel gas fuel-air equivalence ratio of between about 1.6 and 2.4.

24. The gas reformer system of claim 22, wherein the internal combustion engine is configured to produce an exhaust gas comprising hydrogen (H2) and carbon monoxide (CO).

25. The method of claim 1, wherein the engine comprises a plurality of cylinders and all of the cylinders operate as the reactor.

26. The gas reformer system of claim 22, wherein the internal combustion engine is configured so all of the plurality of cylinders are configured to operate with the fuel gas with a fuel air equivalence ratio of between about 1.6 and 2.4.

* * * * *